United States Patent [19]

Norlén

[11] Patent Number: 4,958,872

[45] Date of Patent: Sep. 25, 1990

[54] TENSILE FORCE TRANSMITTING DEVICE, IN PARTICULAR A LIFTING DEVICE

[76] Inventor: HåKan Norlén, Box 58, S-830 05 Järpen, Sweden

[21] Appl. No.: 288,010

[22] PCT Filed: May 5, 1988

[86] PCT No.: PCT/SE88/00233

§ 371 Date: Dec. 12, 1988

§ 102(e) Date: Dec. 12, 1988

[87] PCT Pub. No.: WO88/08810

PCT Pub. Date: Nov. 17, 1988

[30] Foreign Application Priority Data

May 8, 1987 [NO] Norway ................................ 871920

[51] Int. Cl.[5] ................................................ B66C 1/12

[52] U.S. Cl. .................................... 294/75; 294/82.24

[58] Field of Search .................................... 294/74–76, 294/82.16, 82.17, 82.23, 82.24, 111

[56] References Cited

U.S. PATENT DOCUMENTS 690,659 1/1902 Ney ...................................... 294/76

2,385,338 9/1945 Allerton ............................... 294/75

3,163,401 12/1964 Johnston et al. ................. 294/75 X 3,239,266 3/1966 Elliott .............................. 294/75 X 3,709,550 1/1973 Mitchell ............................ 294/111

*Primary Examiner*—Margaret A. Focarino

*Assistant Examiner*—Dean J. Kramer

*Attorney, Agent, or Firm*—Zarley McKee, Thomte, Voorhees & Sease

[57] ABSTRACT

A traction device, in particular devised as a lifting device, comprises a first engagement member (2) for engagement to a first coupling member, an intermediate portion (5) and a second end portion (6) adapted to form an attachment loop by the free end (7) of the end portion being, via a spring loaded locking member (12), releasably locked in a locking mechanism at the end of the intermediate portion adjacent the second end portion. The locking member is, through a connection arrangement (21), connected, in a tensile force transmitting manner, to a second engagement member (22), which is adapted for engagement to a second coupling member and which upon being subjected to a tensile force transmits this tensile force via the connection arrangement to the locking member and thereby releases the free end of the end portion.

8 Claims, 7 Drawing Sheets

29
24
24
21
31
5
25
30
26a
26a
11
16
18
12
10
17
9
15
13
14
7
19
6
22
2
1
5
26
28
28
27
27
30
24
24
Fig_1

15
13
9

37
37
3
2
4
36
36
6
38

2
35
26

24
24

TENSILE FORCE TRANSMITTING DEVICE, IN PARTICULAR A LIFTING DEVICE

FIELD OF INVENTION AND PRIOR ART

The invention is related to a tensile force transmitting elongated device, which primarily is intended to be used as a lifting device. The device is suitably intended to have the character of a lifting strop at least in part flexible. This is particularly suitable for timber transportation by means of helicopter but may also be used for other types of load transports.

Since the beginning of the 1960's one has tried to transport timber by means of helicopter. All parties involved realize that such transport involves a very big market if it would be possible to carry out transportation in an economical manner for the forest owner as well as the helicopter company. There are today very large areas with good timber located so inaccessibly that it is difficult to be used in an economical manner with the means normally used for timber transportation. The cost per hour for a helicopter is, however, very high and the attempts until now carried out with helicopter based timber transportation in association with use of ordinary lifting strops have turned out to be economically doubtful, i.e. the transportation has become too expensive for the forest owner and poorly paid for the helicopter owner.

The lifting strops until now used in the attempts mentioned hereinabove with helicopter transportation are steel wire or artificial fibre strops, which all have in common that they are attached around the log by means of a running loop which when the strop is released from the helicopter lifting hook remains around the log at the unloading location and must be released by personnel on that location. Apart from this work being difficult and sometimes dangerous it has turned out to cause a lot of extra work for the helicopter since it must land to take on board the empty strops which must be brought back to the timber felling location. This extra stop in connection with the retransportation of the lifting strops to the loading location cause the average time and accordingly the rental cost when using helicopter transportation to be unacceptably high and the profit correspondingly low. The requirement for personnel at the unloading location influences the overall economy negatively to a high degree.

SUMMARY OF THE INVENTION

The object of the invention is to devise an improved tensile force transmitting device, by means of which release of the load in question may occur without the entire device having to be released When using the device according to the invention as a lifting strop with helicopter transportation, the helicopter need no longer land to bring with it the empty lifting strops, a fact which enables a considerable reduction of the time of use of the helicopter and a corresponding increase of profit; contributory to high profits is also the fact that no personnel is necessary at the unloading location.

This object is according to the invention achieved with the device more closely defined in appended claim 1. Preferable embodiments of the device according to the invention are defined in the other claims.

The main advantage when using the device according to the invention designed as a lifting strop is that the load carried by the strop may be released therefrom with signal from the helicopter without need of assisting personnel at the unloading location and the strop may, after having released the load, directly accompany the helicopter back to the felling location and be released thereon. The expenses for personnel are reduced at the same time as the helicopter gets a considerably improved continuity in work than in previous attempts since it is no longer necessary to land to pick up the strop. Experiments carried out while using a helicopter of the type Bell 205 having a maximum load capacity of about 1900 kg have illustrated that it is possible, when using the lifting strop according to the invention, to carry out about 30 trips with load per flying hour at a distance between loading and unloading location of about 500 m and with about 2 $m^3$ timber (about 1600 kg) per load. With such an efficient use of flying time it becomes economically motivated to use helicopter to transport timber from felling location to reloading location.

Various releasable and/or self-releasable lifting strop devices for various lifting purposes are previously known but they are not suitable for the object intended to be solved by the present invention; in particular, they are not suitable in connection with helicopter transportation. As examples on such known lifting strops the U.S. Pat. Nos. 1,559,959 and 1,900,194 can be mentioned, which both are dependent upon a separate line for release, and the U.S. Pat. Nos. 2,813,744, 4,181,342 and 2,385,338, which all are of a self-releasing type but wherein release is too unsafe for such lifting strop types to be used in practise in connection with transportation of the kind mentioned hereinabove.

A locking mechanism is per se previously known by e.g. the U.S. Pat. 2,323,914 but in connection with a parachute and without the new and original features characterizing the device according to the present invention.

BRIEF DESCRIPTION OF THE DRAWINGS

With the reference to the appended drawings, a more specific description of embodiment examples of the invention will follow hereinafter.

In the drawings.

DETAILED DESCRIPTION OF PREFERRED EMBODIMENTS

Figure 1:
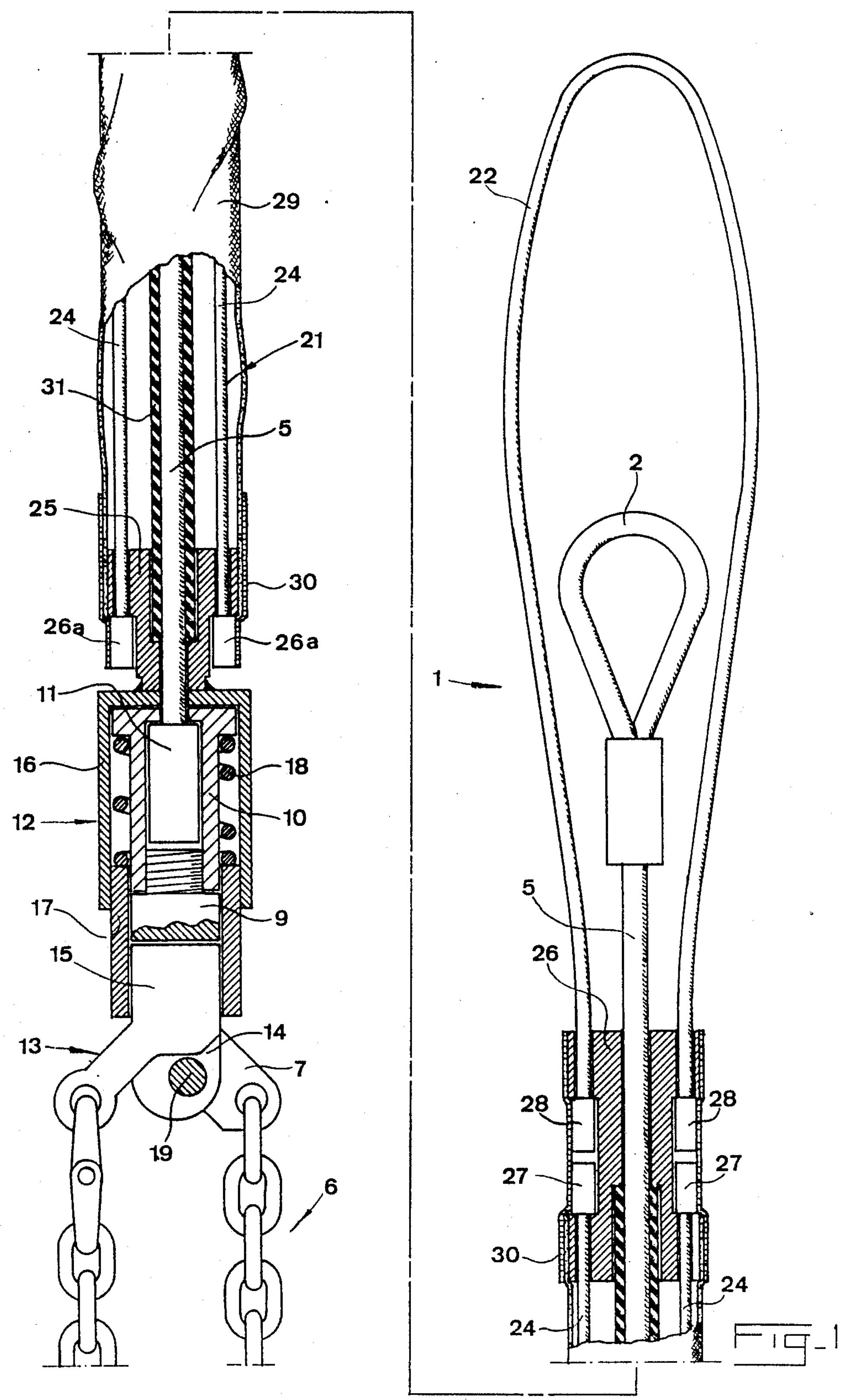
FIG. 1 is a partly sectioned view illustrating the device according to the invention in a locked condition, the left portion in FIG. 1 illustrating the lower part of the device while the right portion of FIG. 1 illustrates the upper part of the device.

The device according to the invention will hereinafter be described as forming a lifting strop. It comprises at a first, upper end portion 1, a first engagement member 2 in the form of a loop adapted to be brought into engagement with a first coupling member 4 of a carrying device 3 illustrated in FIG. 4. As appears for the rest in FIG. 1, the lifting strop comprises an intermediate portion 5, which mainly is formed by a line or steel wire, and a lower end portion 6, e.g. in the form of a chain, adapted to form an attachment loop about the load to be lifted.

One end of the chain 6 is attached to a bracket 7 secured, e.g. by welding, to the shanks 8 of a fork like piece 9 which is in thread engagement with a sleeve 10, which internally houses a widened end piece 11 on the lower end of the wire 5 and at the top abuts against an upper end wall of a sleeve 12. The sleeve 10 as well as the sleeve 12 comprise a central opening, through which the wire 5 passes. The free end of chain 6 is provided with a securing member 13 comprising a portion 15 adapted to be received in the slot shaped space 14 between the shanks 8 of fork piece 9.

Sleeves 10 and 12 form parts of a locking mechanism co-operating with securing member 13. Sleeve 12 is in the embodiment arranged coaxially and externally to sleeve 10 and has the character of a locking sleeve. It is in the embodiment composed of an upper sleeve part 16 and a lower sleeve part 17 rigidly screwed into the upper sleeve part.

A spring 18, in the embodiment a screw compression spring, acts between sleeves 10 and 12 so that space 14 in fork piece 9 connected to sleeve 10 is actuated to be located at least partly surrounded by sleeve 12. The ends of spring 18 abut with pretensioning against an upper flange of sleeve 10 and against a support rigidly secured relative to sleeve 12, said support being in the example formed by the upper end surface of the lower sleeve part 17.

Figure 2:
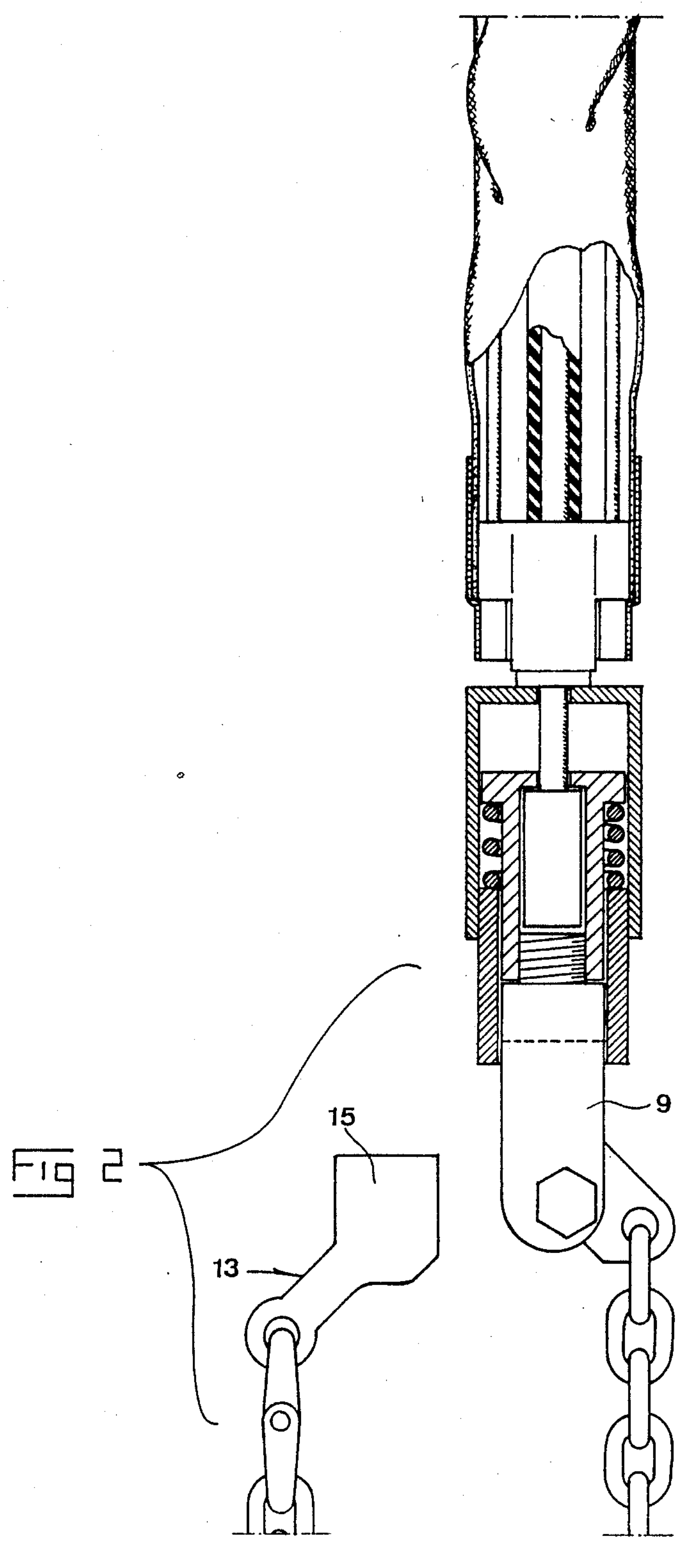
FIG. 2 is a view similar to the left portion of FIG. 1 but illustrating the device in a released condition.

The locking sleeve 12 is movable between a lower locking posiotion, which is illustrated in FIG. 1 and in which it is pressed downwardly by spring 18 so that sleeve 12 with its upper end wall abuts against the top wall of sleeve 10 and thereby locks head portion 15 on locking member 13 within space 14, and an upper position, which appears from FIG. 2 and in which sleeve 12 against the force from spring 18 is lifted so that slot space 14 is liberated and securing member 13 may be introduced into or freely slide out of the space. The direction of movement of the securing member is sidewardly or obliquely downwardly.

Figure 3:
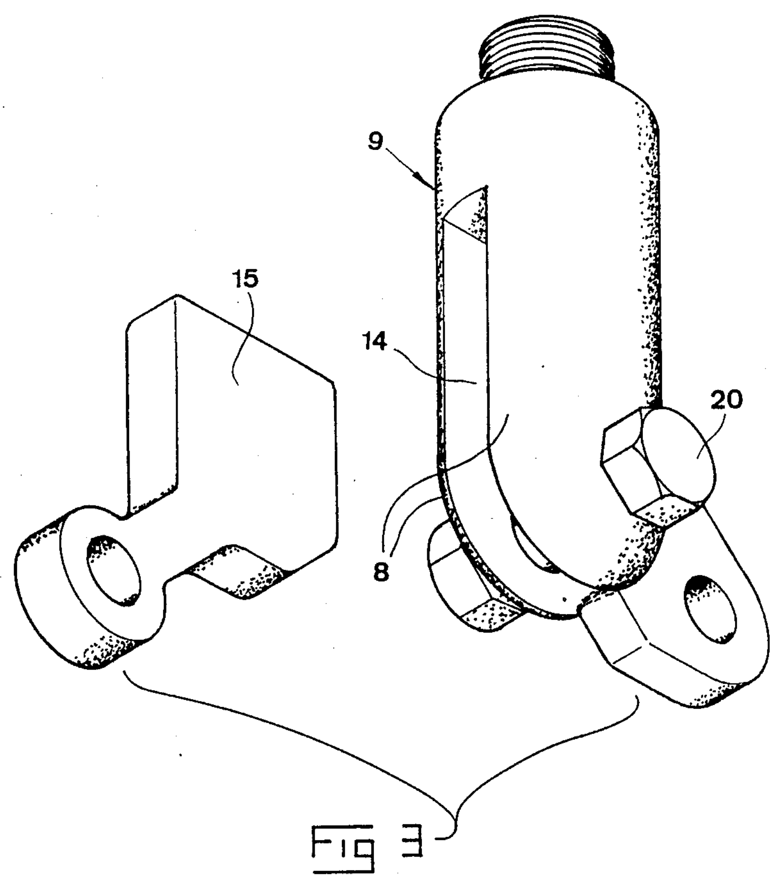
FIG. 3 is a perspective view illustrating components of the locking mechanism.

In the locking position according to FIG. 1 a member 19 serves as obstruction against downward movement of securing member 13. Member 19 is in the embodiment formed by a portion of a bolt 20 extending between shanks 8. As appears from FIG. 3, head portion 15 of the securing member has a plate like shape. Its side edges vertical in the locking position according to FIG. 1 are parallel to the adjacent portions of sleeve 12 and located relatively adjacent thereto so that head portion 15 by sleeve 12 is guided to maintain an upright position until substantially the entire slot 14 has been set free. It is pointed out that piece 9 not necessarily must have the character of a fork since member 19 also could be designed in one piece therewith.

The spring 18 should not be more forceful than allowing the locking sleeve 12 to be pulled into its upper position according to FIG. 2 by hand power in order to allow reintroduction of securing member 13 of the chain into slot 14.

Figure 4:
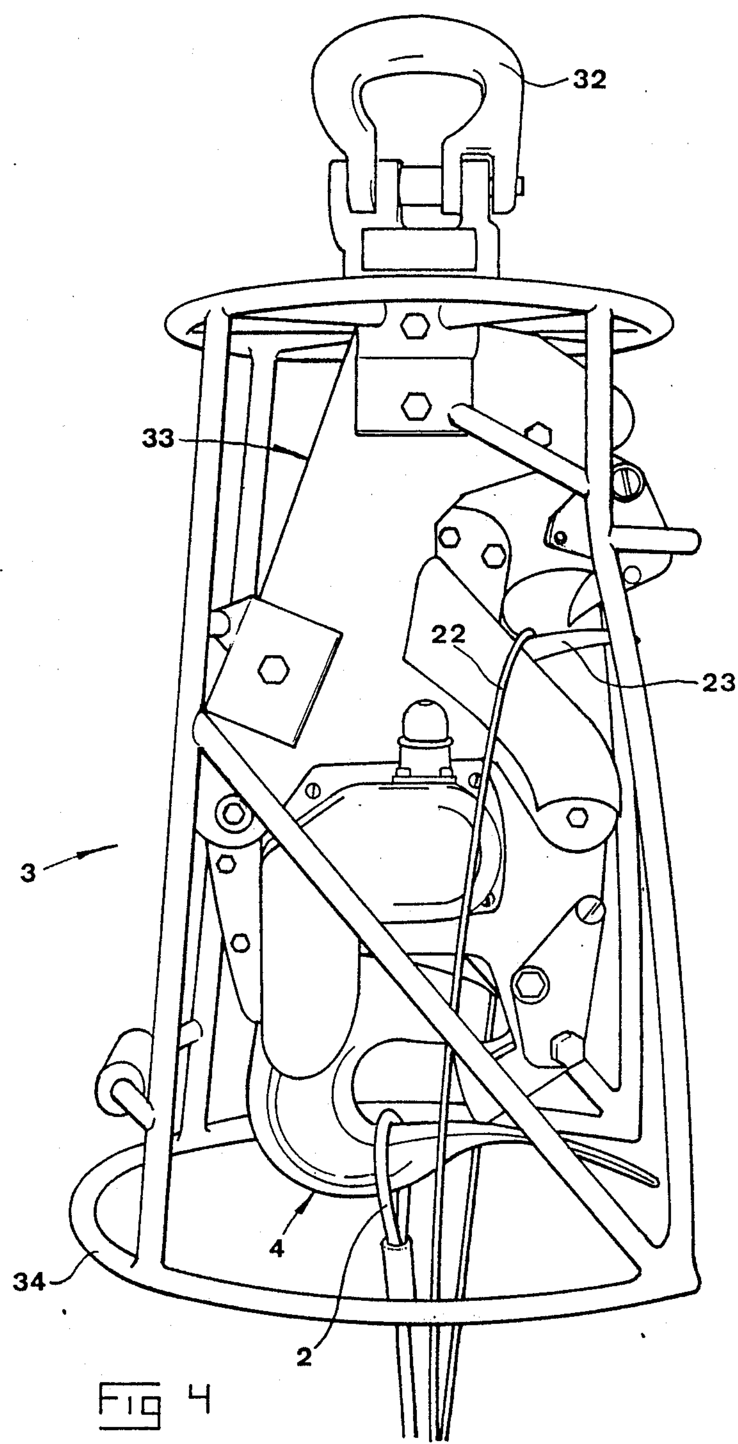
FIG. 4 is a view of a carrying device for the device in FIG. 1.

Locking sleeve 12 is via a connection arrangement 21, which extends along the intermediate portion or wire 5 of the lifting strop, connected in a tensile force transmitting manner to a second engagement member 22 adapted for engagement with a second coupling member 23 (FIG. 4). In the embodiment according to FIGS. 1–4 engagement member 22 is formed by a further loop extending to a point above loop 2 and being bigger than the latter. At least one and in the embodiment two lines or wires 24 as well as coupling pieces 25 and 26 are comprised in the connection arrangement 21. Coupling piece 25 is permanently secured to locking sleeve 12 and presents holes for penetration of wires 24, which at their ends have widened pieces 26*a*. Coupling piece 26 comprises holes for the upper ends of wires 24 and also the latter are provided with widened end pieces 27. Loop 22 has its ends protruding through holes in coupling piece 26 and provided with widened heads 28. The arrangement described forms accordingly a tensile force transmitting connection between loop 22 and sleeve 12. The wire 5 passes movably through coupling pieces 25 and 26.

Along the flexible section of intermediate portion 5 and connection arrangement 21, i.e. along wires 5, 24, these are surrounded by an elongated casing 29. This casing serves to hold the wires 5, 24 together and avoid that they inadvertently hook on to some object Casing 29 may for instance have the character of an elongated hose or stocking, which at its upper and lower ends is attached relative to the connection arrangement 21. This attachment may for instance be realized by winding tape indicated at 30 about casing 29 in its end areas so that casing 29 is held relative to coupling pieces 25 and 26 or relative to wires 24 above and under respectively the coupling pieces 25 and 26. Casing 29 may be formed by fabric material, e.g. woven material It could also be formed by a plastic hose.

Wire 5 is surrounded by a tubular envelope 31, which as casing 29 is flexible Wires 24 are arranged externally of tube 31 and wire 5 is longitudinally displaceable within tube 31. The ends thereof are in the manner indicated in FIG. 1 received in seats in coupling pieces 25 and 26. It may be preferable to secure the wires 24 relative to tube 31 in the area between the ends of the wires, e.g. by winding adhesive tape before application of casing 29 about wires 24.

The carrying device illustrated in FIG. 4 comprises means 32, here in the form of an eye, to be suspended from a helicopter via suitable coupling equipment. The device comprises further a frame 33, to which a protective cage 34 is secured. The coupling members 4 and 23 are both formed by remotely releasable load hooks. More specifically the load hooks may be released by the helicopter pilot for releasing each of the loops 2 and 22. Load hooks 4 and 23 are known per se and are for instance accessible from the company Cargo Aids Limited, Bexhill-on-Sea, Sussex, England, under the designation SACRU SP 7109/3B and SACRU CA 3000. The load hooks are releasable by being deliberated to pivot downwardly so that loops 2 and 22 may slide off the hooks A new characteristicum for the carrying device 3 is, however, the location of hooks 4, 23 at different levels in correspondence to the level difference between loops 2 and 22 and the design of load hooks 4, 23 so that they are intended to simultaneously co-operate with two engagement members of the same lifting strop.

With helicopter based timber transportation, the lifting strop described functions as follows:

The helicopter flies with the carrying device illustrated in FIG. 4 with the electrically or otherwise releasable load hooks to the loading location, where present personnel already have prepared the lifting strops to be brought by the helicopter in the same lift so that these lifting strops each comprise a log attached in chain loop 6. With the helicopter hovering above the ground, the lifting strops are with their main loops 2 hooked on to load hook 4 at the same time as the upper loops 22 of the lifting strops are hooked on to the upper load hook 23. The loop 22 of the lifting strops is so dimensioned that the entire load via loop 2 is transferred to hook 4 when each individual strop hangs from the carrying device 3 so that loop 22 accordingly is only retained in upper load hook 23 without taking up any part of the load.

When all lifting strops intended to take part in the helicopter lift are coupled to carrying device 3, the helicopter flies to the unloading location, where the pilot at a suitable altitude above ground releases the lower load hook 4 of carrying device 3 so that this load hook sets the main loop 2 of the lifting strop free with the result that the upper loop 22 takes over the load and accordingly via wires 21 pulls locking sleeve 12 free from slot 14 in piece 9, which in its turn is actuated downwardly by the weight of the log suspended in chain loop 6 until the position according to FIG. 2 is reached, in which securing member 13 is drawn out of slot 14 and liberates the log from the lifting strop. With the empty released lifting strop hanging via the upper loop 22 in the upper hook 23 the helicopter then flies back to the felling location, where the pilot releases hook 23 so that all lifting strops fall down on the ground. During the intermediate time, the ground personnel has prepared a new set of lifting strops for the next timber transportation, which occurs in the manner described above. While the helicopter is away the personnel uses the lifting strops from the preceding load for preparing the next transportation and so on.

Figure 5:
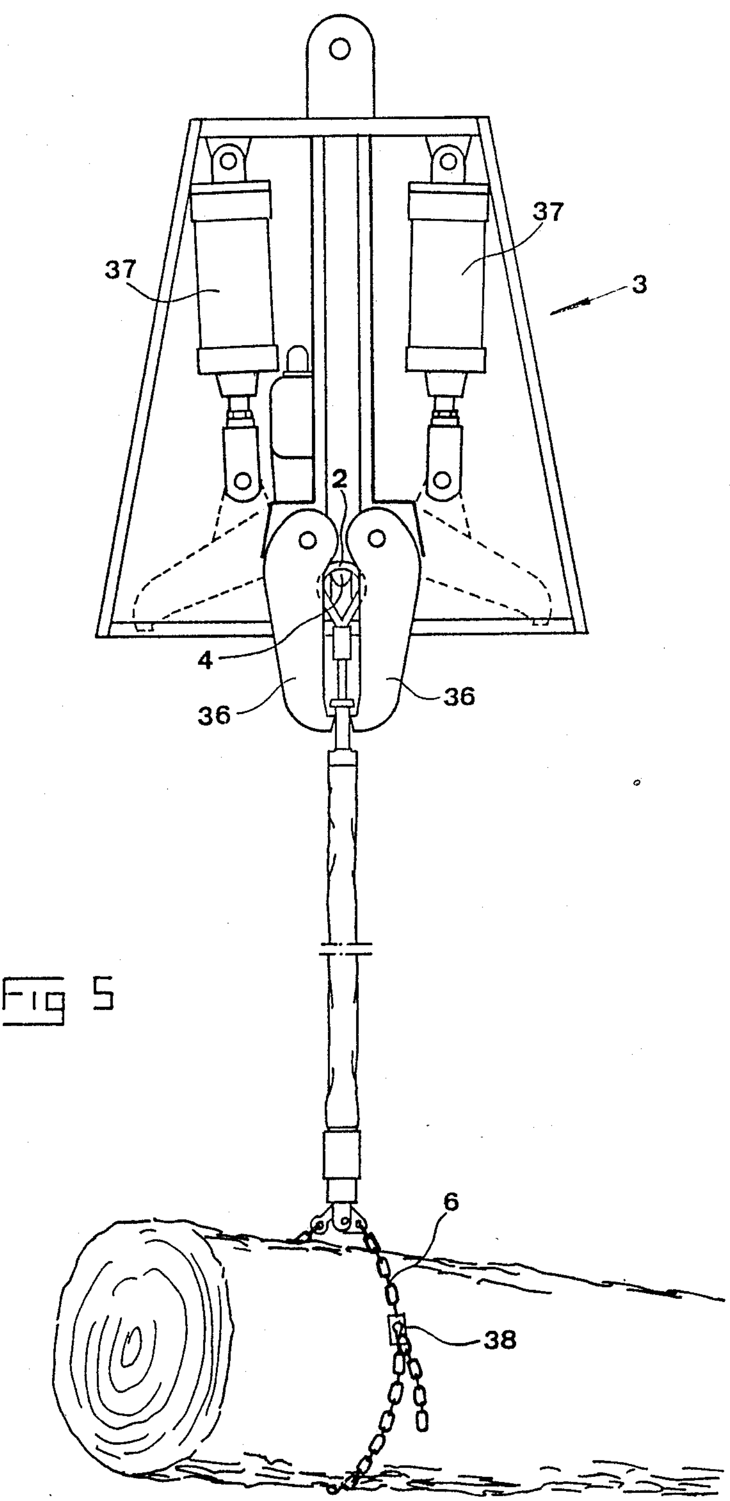
FIG. 5 is a view illustrating an alternative embodiment.
Figure 6:
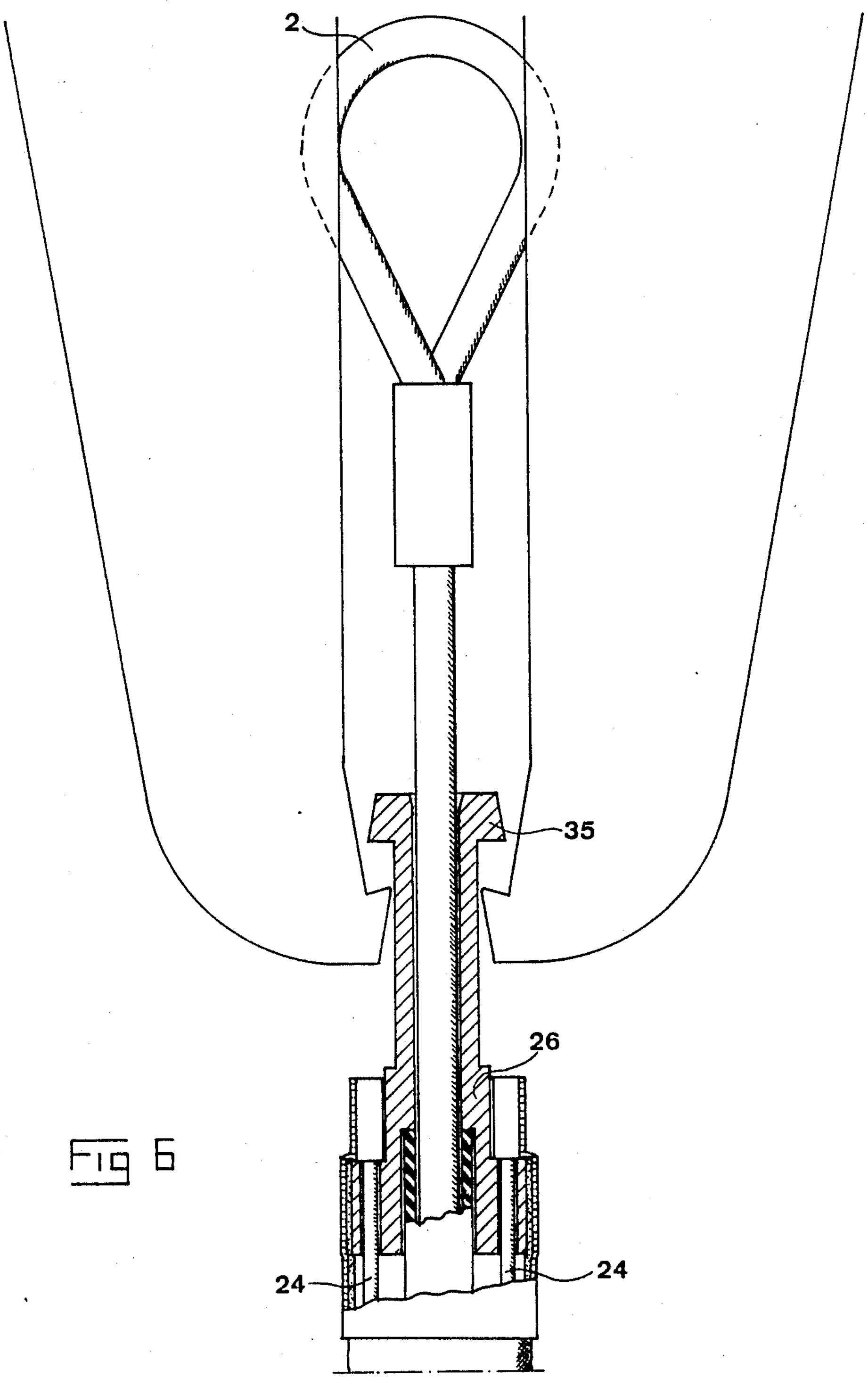
FIG. 6 is an enlarged view of a detail from the embodiment according to FIG. 5.

In the variant illustrated in FIGS. 5 and 6, the lifting strop comprises, instead of the upper loop 22, a flange 35 connected in a tensile force transmitting manner to coupling piece 26 and accordingly the wires 24 via an upwardly directed extension of coupling piece 26. As previously carrying device 3 (FIG. 5) comprises a releasable load hook 4 for loop 2 of the lifting strop. Load hook 23 in the previous embodiment is, however, here replaced by a coupling member realized in the form of gripping members 36, at least one of which and in the embodiment both being movable so that the gripping members may hookingly engage under flange 35. The gripping members 36 are in the embodiment both pivotably movable by means of power members 37. When loop 2 of the lifting strop hangs in hook 4, the gripping portions of gripping members 36 are located somewhat below flange 35. When load hook 4 releases loop 2, gripping members 36 take over the carrying function in that flange 35 engages the gripping members. Due to this chain sling 6 is released in the manner previously described so that the log is set free. When the helicopter has returned to the loading location, gripping members 36 are opened and thereby the carried lifting strops are set free and allowed to fall down on the ground. In FIG. 5 it is also indicated that chain sling 6 comprises means 38 known per se for varying the size of the sling.

Figure 7:
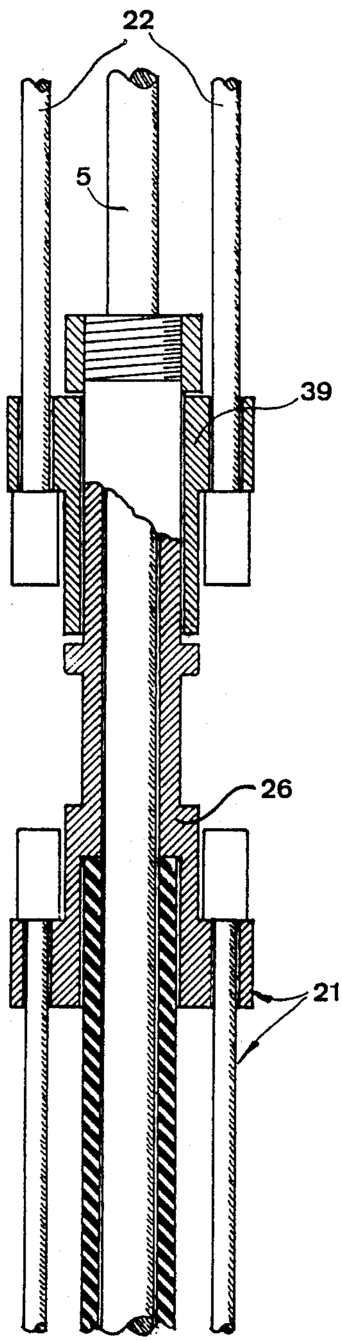
FIG. 7 is a detailed view illustrating a further alternative.

The variant in FIG. 7 corresponds to the right portion in FIG. 1 with the exception that loop 22 in FIG. 7 is arranged on a part 39, which is connected in a tensile force transmitting but freely rotatable manner relative to connection arrangement 21 and coupling piece 26 contained therein, which simplifies the loading procedure. More specifically, part 39 surrounds a portion of coupling piece 26 and as previously, wire 5 runs straight through the coupling piece.

The device described is of course not limited to the illustrated embodiment. Thus, it can be mentioned that the device of course may be used for lifting arbitrary loads. The device is for the rest not limited only to lifting but can be used for tensile force transmittance horisontally as well as in sloping situations. As an example it can be mentioned that the device could be used for towing, where the towing object could comprise coupling members for engagement with engagement means 2; 22, 35 while the towed object could engage with attachment loop 6. Further, the device according to the invention could be used for hoisting of various loads, e.g. timber in sloping terrain. Also other modifications are conceivable within the scope of the invention.

I claim:

1. A device for transmitting tensile force, in particular a lifting device, comprising, at a first end portion, a first engagement member (2) adapted for engagement with a first coupling member (4), an intermediate portion (5) and a second end portion (6) adapted to form an attachment loop by the free end (13) of the second end portion being, by means of a spring loaded locking member (12), releasably locked to a locking mechanism at the end of the intermediate portion adjacent the second end portion (6), the locking member (12) being, by means of a connection arrangement (21) extending along the intermediate portion of the device, in a tensile force transmitting manner connected to a second engagement member (22, 35), which is adapted for engagement with a second coupling member (23, 36) and which upon being subjected to tensile force transmits this tensile force via the connection arrangement to the locking member (12) and thereby actuates the locking member to release the free end (13) of the second end portion so as to open the attachment loop, the intermediate portion (5) and the connection arrangement (21) being at least in part surrounded by an elongated casing (29), the intermediate portion (5) and the connection arrangement (21) comprising an elongated flexible section and the casing (29) being flexible and surrounding said section.

2. A device according to claim 1, wherein the first coupling member (4) for co-operation with the first engagement member (2) is releasable while tensile force is being exerted on the device.

3. A device according to claim 2, wherein the first coupling member comprises a releasable load hook (4).

4. A device according to claim 2, wherein the second engagement member (22, 35) is adapted to take over the tensile force from the first engagement member (2) upon releasing of the first coupling member (4) and deliberation of the first engagement member (2) caused thereby.

5. A device according to claim 4, wherein the second coupling member (23, 36) is releasable.

6. A device according to claim 1, wherein the intermediate portion (5) at least in part is surrounded by and longitudinally displaceable within a flexible envelope (31), the connection arrangement (21) being arranged externally of the envelope (31).

7. A device according to claim 1, wherein the spring loaded locking member (12) is a sleeve, which in its locking position retains a securing member (13) at the free end of the second end portion in a space (14) at the end of the intermediate portion.

8. A device according to claim 7, wherein the space (14) is located between two shanks (8) of the intermediate portion.

* * * * *